United States Patent
Glance

(10) Patent No.: US 6,435,579 B1
(45) Date of Patent: Aug. 20, 2002

(54) BUMPER BEAM HAVING DOUBLE OPEN SIDED CHANNEL MEMBERS

(76) Inventor: Patrick M. Glance, 14789 Keel St., Plymouth, MI (US) 48170

( * ) Notice: Subject to any disclaimer, the term of this patent is extended or adjusted under 35 U.S.C. 154(b) by 0 days.

(21) Appl. No.: 09/696,493

(22) Filed: Oct. 25, 2000

Related U.S. Application Data

(60) Provisional application No. 60/161,632, filed on Oct. 27, 1999.

(51) Int. Cl.$^7$ ................................. B60R 19/04
(52) U.S. Cl. ................ 293/155; 293/102; 293/120; 293/123
(58) Field of Search ................ 293/155, 102, 293/120, 123, 154

(56) References Cited

U.S. PATENT DOCUMENTS

| | | | |
|---|---|---|---|
| 1,623,412 A | * 4/1927 | Jandus | .............. 293/155 |
| 4,010,969 A | 3/1977 | Cantrell et al. | |
| 4,679,837 A | 7/1987 | Bayer et al. | |
| 4,829,979 A | * 5/1989 | Moir | .............. 293/155 X |
| 5,080,411 A | 1/1992 | Stewart et al. | |
| 5,123,688 A | * 6/1992 | Takado et al. | .......... 293/155 X |
| 5,306,058 A | 4/1994 | Sturrus et al. | |
| 5,395,036 A | 3/1995 | Sturrus | |
| 5,603,541 A | 2/1997 | Wada et al. | |
| 5,669,992 A | 9/1997 | Bronsema et al. | |

FOREIGN PATENT DOCUMENTS

JP          406106977 A  *  4/1994  ............... 293/155

* cited by examiner

Primary Examiner—Joseph D. Pape
Assistant Examiner—Lori L Coletta
(74) Attorney, Agent, or Firm—Walters & Morse, P.C.

(57) ABSTRACT

A bumper beam comprises a first and second channel members, a plate, and a mount. Each of the first and the second channel members being an elongated member that has a length between two opposing ends and a generally U-shaped cross section with a web that has two opposing edges and a pair of flanges that project in the same general direction from the two opposing edges of the web to terminal ends. The two web edges and the flanges extending along the length. The plate extends between and connecting the first and the second channel members. The mount is connected with one of the first and the second channel members whereby the bumper beam is connected with a frame member of a vehicle.

16 Claims, 7 Drawing Sheets

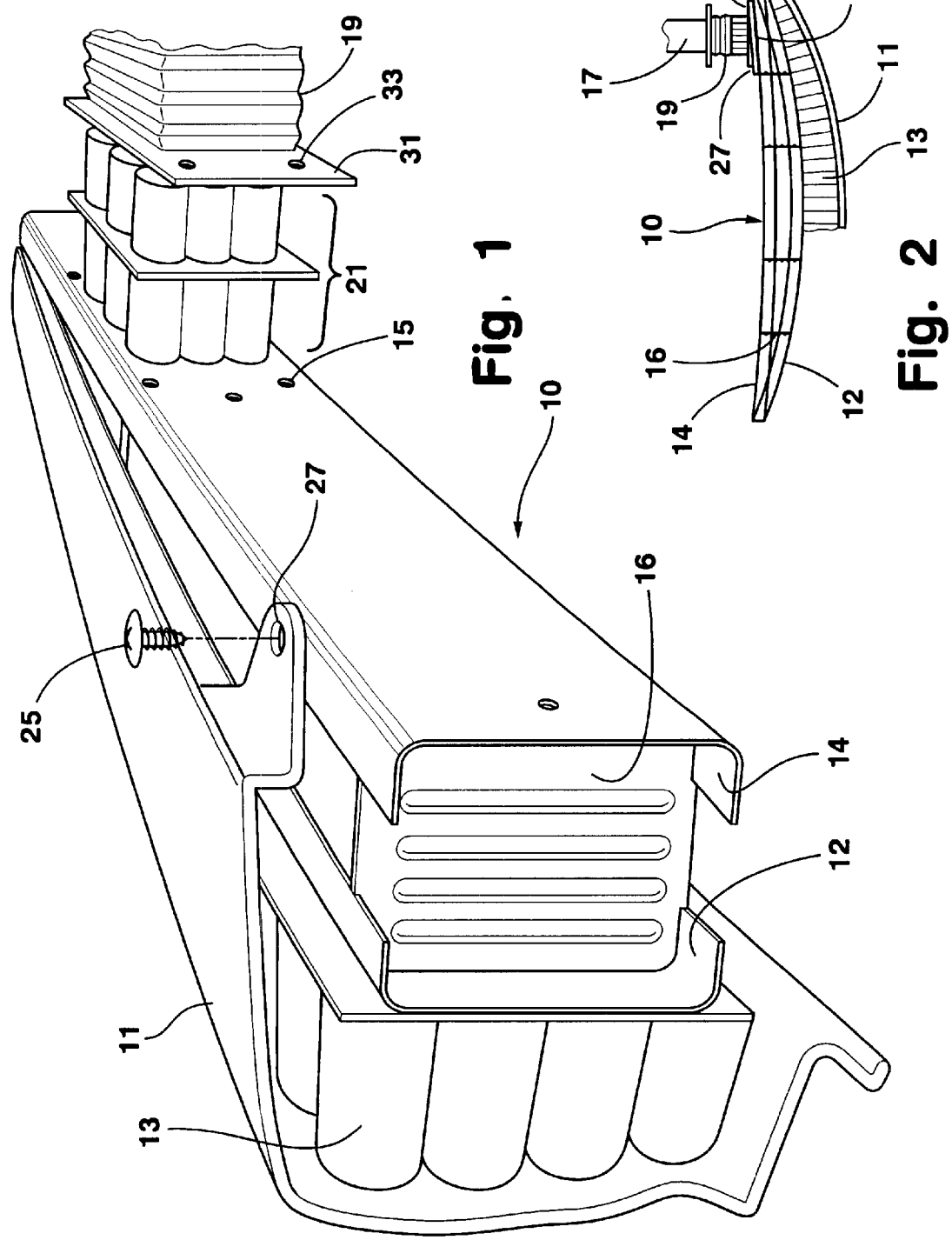

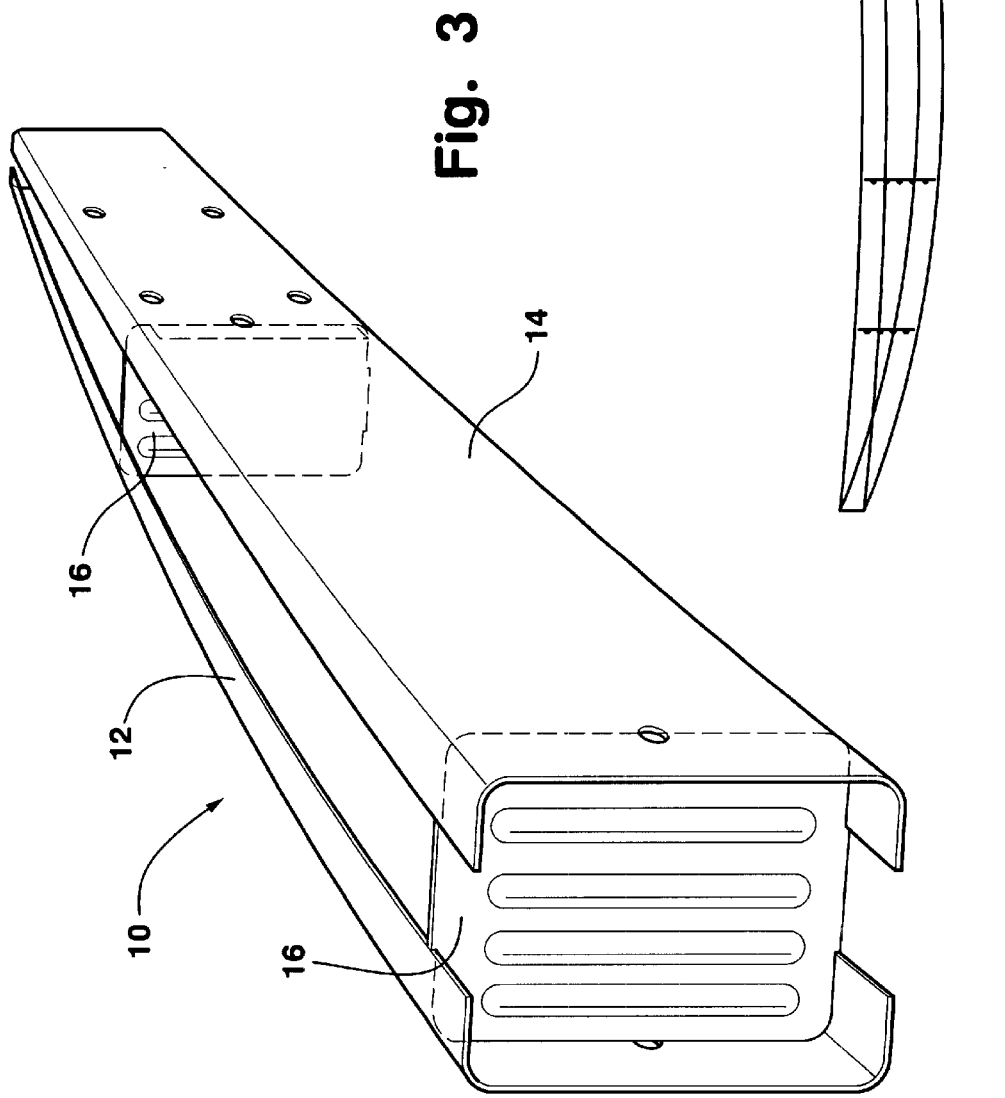

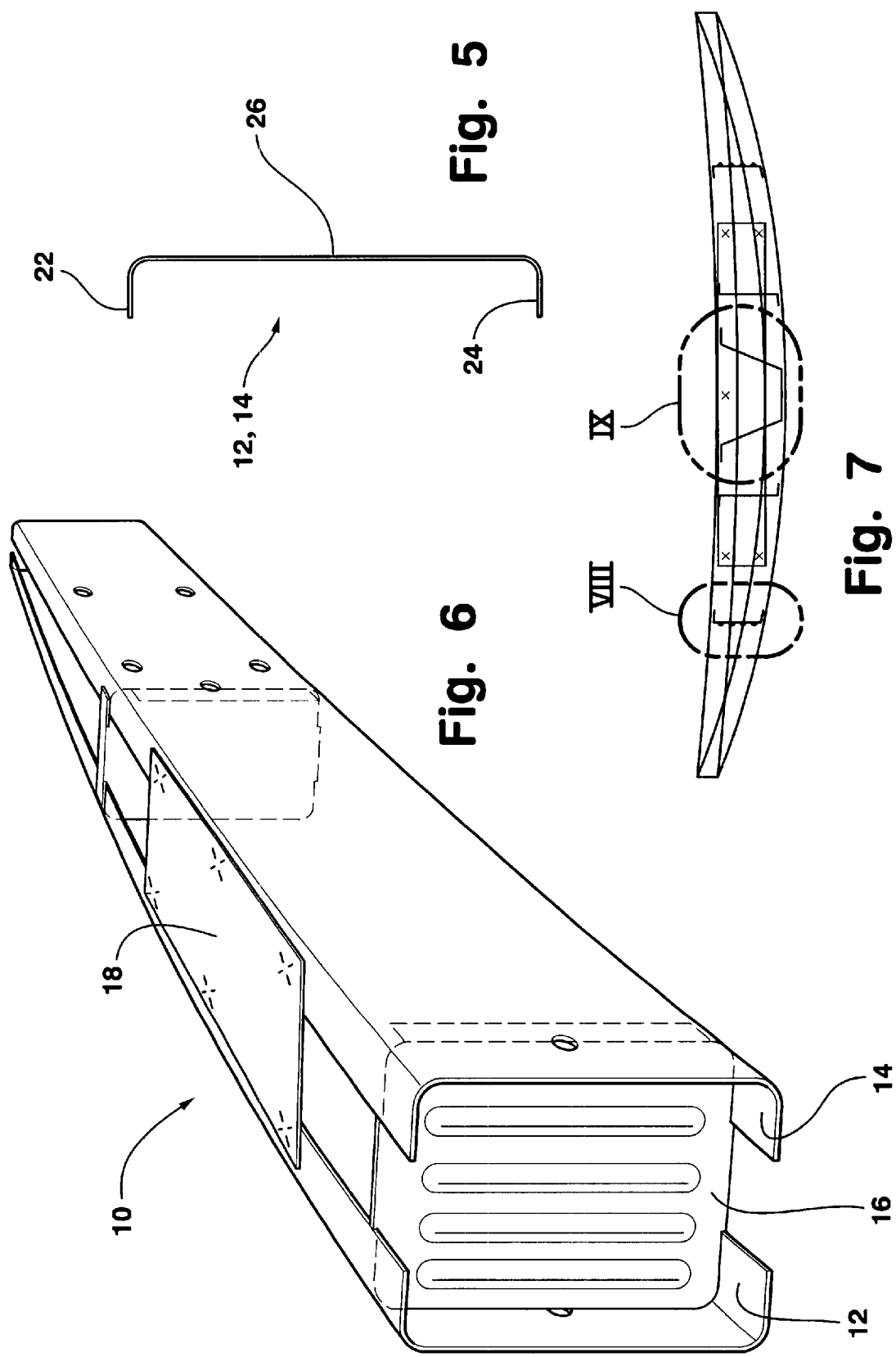

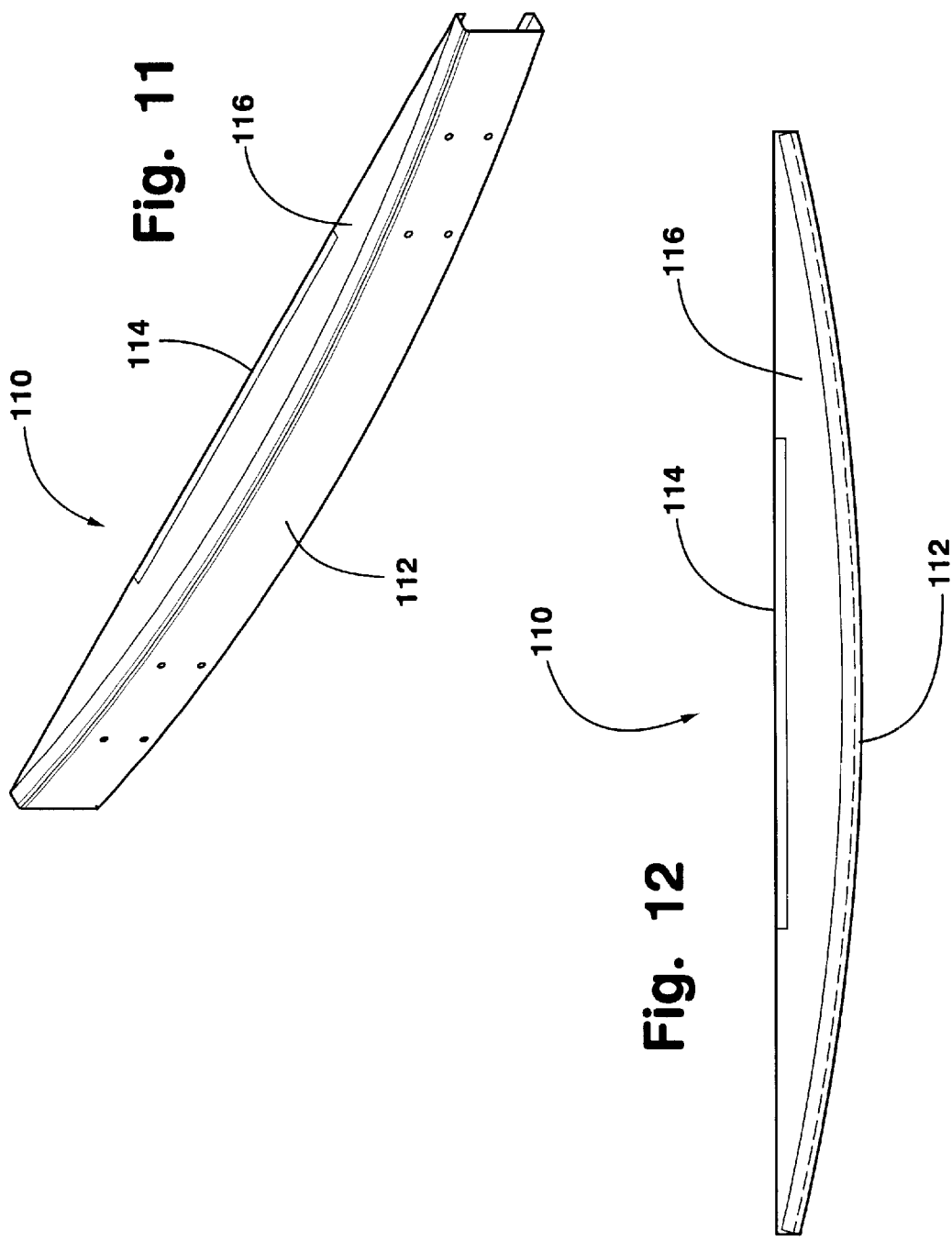

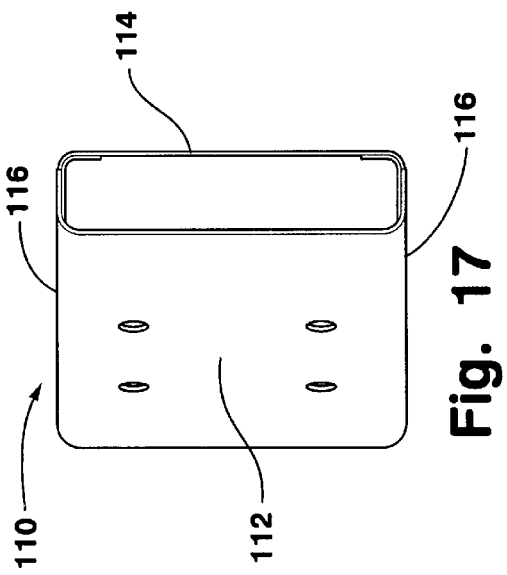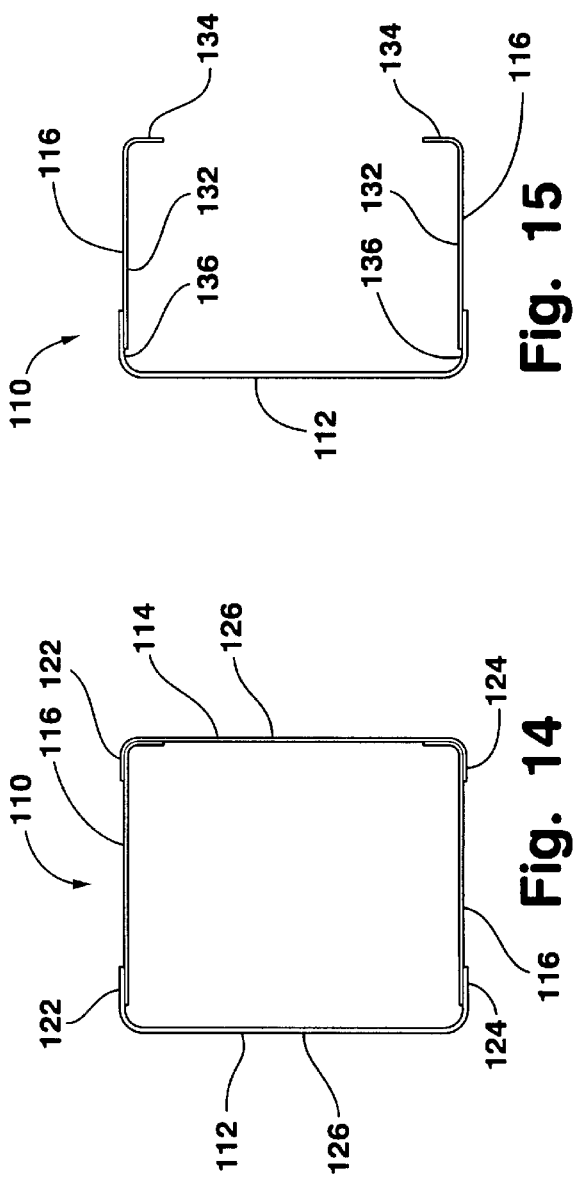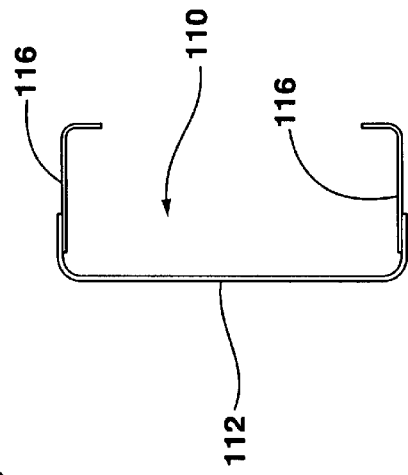

BUMPER BEAM HAVING DOUBLE OPEN SIDED CHANNEL MEMBERS

CROSS-REFERENCES TO RELATED APPLICATIONS

This is a continuing non-provisional patent application of co-pending U.S. provisional Patent Application Ser. No. 60/161,632, entitled Bumper Beam Having Double Open Sided Channel Members and filed on Oct. 27, 1999 by Patrick M. Glance, now co-pending, the disclosure of which is incorporated here by reference.

STATEMENT REGARDING FEDERALLY SPONSORED RESEARCH OR DEVELOPMENT

Not Applicable.

BACKGROUND OF THE INVENTION

Currently, many automotive bumper beams are roll formed from high strength steel. These beams are roll formed and seam-welded to create a closed section bumper beam that is an efficient light weight structure. The limitations of the roll form process permit only a constant cross-sectional shape, and the limits of high strength steel permits only limited plan view sweep (curvature) being formed into the beams. For rear bumper beams, where a straight or small sweep beam is required, a roll formed high strength beam is well suited. For front end vehicle applications, where the current styling trends require large plan view sweep, however, the roll formed section cannot follow the sweep of the fascia. This results in filling the excess space between the beam and fascia with absorber foam, or utilizing an extruded aluminum or stamped beam. An extruded aluminum beam has higher sweep capability, but is more expensive. Both extruded aluminum and roll formed beams have the disadvantage of a constant cross-sectional shape. This forces the bumper designer to utilize the maximum strength cross section throughout the length of the bumper, although it is not required along the entire length and is typically only required at the center.

Thus, one may easily see the need to provide a high strength bumper beam that has high sweep capability and the capability to vary the cross section depth. This will permit use of high strength steel in a tailored cross section. The result will be an extremely efficient, light weight structure that will allow secondary cost savings by eliminating unnecessary absorber and fascia package space.

BRIEF SUMMARY OF THE INVENTION

The approach to this task is to create two ultra high-strength, shallow, open C-sections, by roll forming or press braking, and sweeping them individually. The two sections are welded to transverse support members, such as "bulkhead plates", between the c-section assembly to form a bumper beam structure. The bulkhead plates can be corrugated to provide beam crush during a high speed vehicle crash. This is desirable to provide additional energy absorption and crush space. A second alternative is to incorporate energy absorbing structures, such as injection molded cones, or deformable solids, for example, between the C-Sections to absorb additional energy during a high speed crash when the C-Sections will be crushed.

The sweeping of the shallow open sections can be more easily accomplished than sweeping a deep closed section. This permits use of even higher strength steels, including materials that have a yield strength of about two hundred twenty thousand pounds per square inch (220 kips) or other metals and composite materials. Each C-section can be swept to a different sweep to create a variable cross section depth beam when the two are assembled to form the final beam. The variable cross section permits tailored bending stiffness along the length of the beam and results in less material usage, lower mass, and lower cost than a constant section beam.

The structural concept of the double C-section also has application to other beam applications, including side door guard beams, for example. Many design variations of the bulkheads are also, possible. They could be simple plates, corrugated, plates with end flanges, a W-section, or serpentine section, for example. A main function of the bulkheads is to weld the front and rear C-sections together. Variations in the design of the front and rear sections are also possible, and are covered within the spirit of this disclosure.

A secondary function of the bulkheads is to provide additional energy absorption during high speed impact and crush of the vehicle front end. Variations in the design of internal, deformable bulkheads, incorporating crush energy absorbers including plastic cells, foam, epoxy composite, ceramic forms, are possible and are covered with the spirit of this disclosure.

These and other features, objects, and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 1 is a fragmentary longitudinal perspective view of a bumper assembly according to the invention;

FIG. 2 is a bottom plan view thereof;

FIG. 3 is a fragmentary longitudinal perspective view of two open sided beam members assembled into a beam according to the invention;

FIG. 4 is a bottom plan view thereof;

FIG. 5 is a cross-sectional view of an open sided beam member used in the invention;

FIG. 6 is the view of FIG. 3, showing optional tie plates between the channel members;

FIG. 7 is the view of FIG. 4, showing alternative tie plates between the channel members;

FIG. 11 is a front longitudinal perspective view of a first alternative bumper assembly according to the invention;

FIG. 12 is a top plan view thereof;

FIG. 14 is a cross-sectional view thereof along line XIV—XIV of FIG. 13;

FIG. 15 is a cross-sectional view thereof along line XV—XV of FIG. 13;

FIG. 16 is a cross-sectional view thereof along line XVI—XVI of FIG. 13; and

FIG. 17 is an end elevational view thereof.

DETAILED DESCRIPTION OF THE INVENTION

Figure 10:
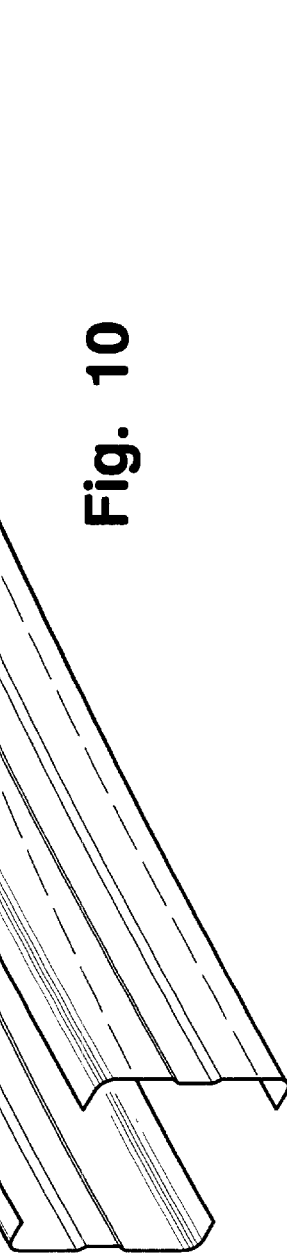
FIG. 10 is a fragmentary longitudinal perspective view of two open sided beam members positioned as they would be assembled into a beam according to the invention, showing an alternative cross section for the channel members.

A preferred embodiment of a bumper beam of the invention is generally shown in the drawing figures and identified with the reference number 10. The bumper beam 10 includes opposing first and second channel members 12 and 14, respectively, and at least one plate 16 that interconnects the channel members (FIGS. 1–7). The channel members 12 and 14 are preferably aligned with one another. Thus, the channel members 12 and 14 are preferably generally parallel with one another and centered relative to one another. A facia 11 can cover the front of the beam. Energy absorbers 13 can be positioned between the facia and the beam. Screw fasteners 25 screw into holes 27 in the beam to hold the facia on the beam.

The channel members 12 and 14 may be configured similarly or distinctly. That is to say that identical channel members may be used in both of the first and second positions. More typically, the first channel member 12 with be constructed as an arcuate channel member while the second channel member 14 is generally linear. This is not to say that the second channel member 14 cannot be an arcuate member, only that most commonly as applied to a vehicular bumper, the second channel member is expected to have a curvature, if any at all, that is relatively more straight than the first channel member 12.

The two channel members 12 and 14 may also be constructed similarly or distinctly. Any of various structural materials, commonly including and not limited to metals and plastics, may be used to fabricate the channel members 12 and 14. Use of the invention overcomes limitations of prior bumper constructions and facilitates the use of high strength steel, for example. Accordingly, any fabrication method that is appropriate to the selected material may be used. Also, a user's or manufacturer's requirements may dictate that the channel members 12 and 14 be fabricated of the same materials, or not, and with the same methods, or not. Further, structural considerations of specific installations of a bumper beam according to the invention may indicate that the two channel members 12 and 14 have the same or differing cross-sectional shapes. In one exemplary configuration, the second channel member 14 may be a length of rolled steel channel with a generally U-shaped cross section, while the first channel member 12 may be molded of a plastic with a curved contour along its length and with a generally C-shaped or semi-circular cross section.

As is generally shown, the first and second channel members 12 and 14, respectively, are simple open sided channel members. More specifically each of the channel members 12 and 14 has a U-shaped or C-shaped cross section with two legs or flanges 22 and 24 extending in generally the same direction from opposing edges of a bight or web portion 26 (FIG. 5) The second channel member 14 will commonly be generally linear, while the first channel member 12 will commonly be generally arched, with the corresponding ends of the channel members meeting (FIGS. 1–7). The channel members 12 and 14 are interconnected by an array or series of the bulkheads or tie plates 16 (FIG. 3). Beam 14 is mounted on the frame end flanges 31 at the end of frame members 17 by fasteners 29 that engage mounts or mounting holes 15 in the beam section 14 and mating holes 33 in the frame end flange (FIG. 2). Energy absorbers 19 and 21 can be positioned at the end of the frame and between the end of the frame and the bumper beam.

Figure 9:
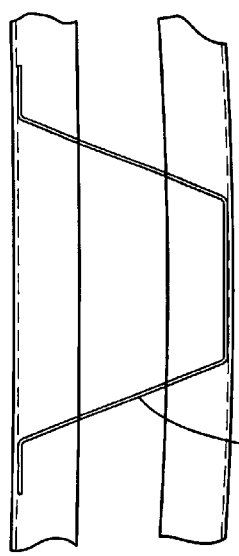
FIG. 9 is a fragmentary top plan view of a beam according to the invention, showing a serpentine bulkhead with fastening flanges.
Figure 8:
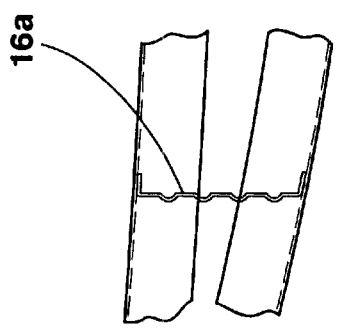
FIG. 8 is a fragmentary top plan view of a beam according to the invention, showing a corrugated bulkhead with fastening flanges.
Figure 13:
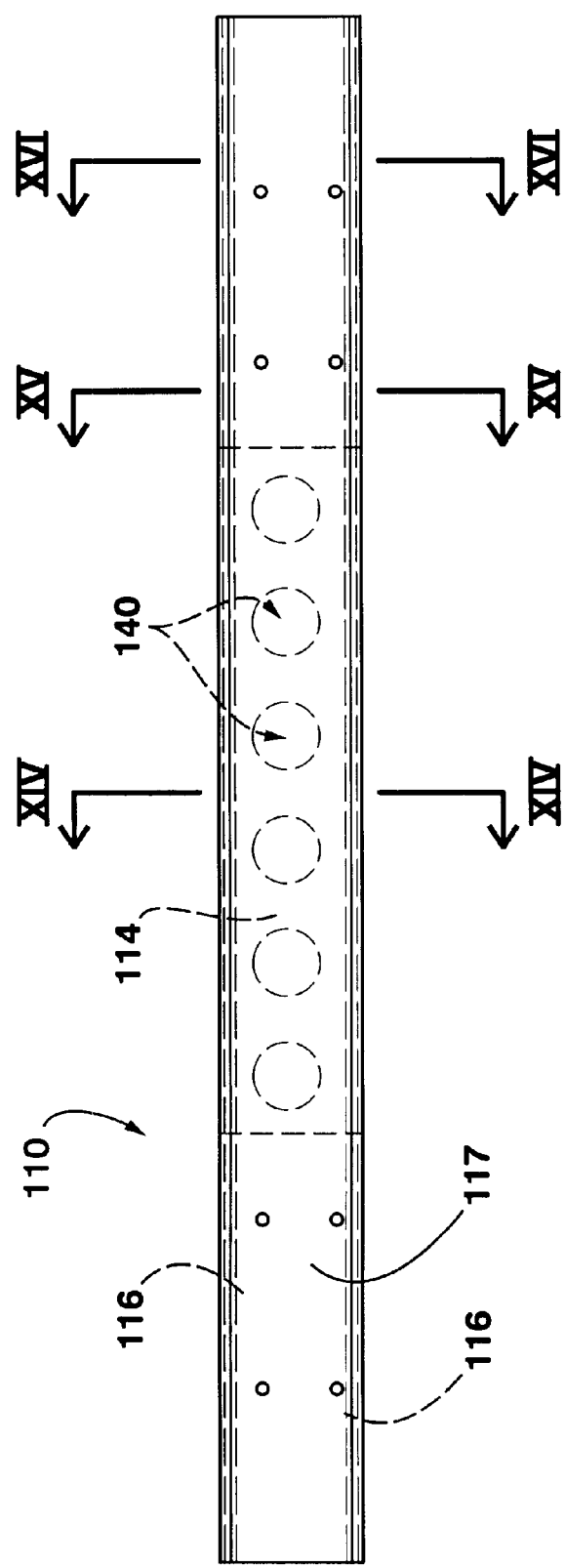
FIG. 13 is a front elevational view thereof.

The bulkheads 16 may also be constructed of various structural materials by appropriate methods. While the bulkheads 16 and 16a (FIG. 8) are shown as corrugated members with generally flat edges, they may also be fabricated in various alternative configurations according to the preferences or structural requirements of the user or manufacturer, such as the serpentine shape 16b employed in the center of the beam in FIG. 9. Further, specific considerations of a particular installation may influence the configuration and fabrication of the bulkheads 16, including the number and spacing of the bulkheads, for example. One of numerous variations of the use of interconnecting bulkheads or tie plates between the channel members 12 and 14 may include the use of plates 18 between the respective flanges 22 and 24 of the channel members, for example (FIG. 6).

A first alternative embodiment of a bumper beam of the invention is also generally shown in the drawing figures and identified with the reference number 110 (FIGS. 11–17). The bumper beam 110 also includes opposing first and second channel members 112 and 114, respectively, and at least one tie plate 116 that interconnects the channel members (FIGS. 11–17).

As with the channel members 12 and 14, the channel members 112 and 114 are also preferably aligned with one another, being generally parallel with one another and centered relative to one another. The channel members 112 and 114 may also be configured or constructed similarly or distinctly, as discussed above regarding the channel members 12 and 14.

The first and second channel members 112 and 114, respectively, are also simple open sided U-shaped channel members with two legs or flanges 122 and 124 extending in generally the same direction from opposing edges of a bight or web portion 126 (FIG. 14). The second channel member 114 will commonly be generally linear, while the first channel member 112 will commonly be generally arched, with the corresponding ends of the channel members meeting (FIGS. 11–12). The channel members 112 and 114 are interconnected by the bulkheads or tie plates 116 (FIGS. 11, 12, and 14). A noted difference of the use of the plates 116 in the beam 110, as compared to the plates 16 in the beam 10, is that the channel member 114 may be truncated to extend along only a central portion of the beam 110, while the plates 116 continue outward to the ends of the channel member 112.

The plates 116 may also be constructed with various configurations of various structural materials by appropriate methods for the configuration and material selected. As shown, the plates 116 are what may commonly be known as flange plates, having a web 132 and a flange 134 (FIG. 15). The tie plates 116 have a forward or leading edge 136 that preferably corresponds to and follows any curve or other contour of the front or first channel member 112. The tie plates 116 also have an opposing back or trailing edge, which is defined by the plate flange 134. The trailing edge will preferably correspond to the back or second channel member 114. Thus, the tie plate trailing edge will commonly be substantially straight, which is easily manufactured, but may alternatively incorporate a curve or other contour.

As noted above, the channel member 114 may be truncated to extend along only a central portion of the beam 110, while the plates 116 continue outward to the ends of the channel member 112. Conversely, the second channel member 114 may extend fully along the length of the beam 110 or may comprise a series of channel member segments that are disposed along the beam length. In consideration of weight considerations, lightening holes 140 may be used in the web 126 of the second channel member 114 and may also be used in the webs 132 of the tie plates 116 and the web 126 of the first channel member 112, as permitted by desired structural performance criteria.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. A bumper beam for a vehicle comprising:
   a C-shaped first channel member, the first channel member including a vertically oriented first web portion, the first web portion having opposing front and back sides the first channel member further including flanges extending rearwardly from upper and lower edges of the back side of the first web portion frame, the first channel member having a significant curvature in a horizontal plane;
   a C-shaped second channel member, the second channel member including a second web portion, the second web portion having opposing front and back sides, the second channel member further including flanges extending forwardly from upper and lower edges of the front side of the second web portion, the first and second channel members being at least partially spaced apart and being directly opposite each other, with the first channel member back side facing the second channel member front side, the second channel member having less curvature in a horizontal plane than the first channel member, such that the longitudinal spacing between the web portions of the channel members differs over the length of the beam, with the spacing between the channel members being greater at the center of the bumper beam than the ends of the bumper beam; and
   at least one plate connecting the first web and the second web portions so as to hold the channels in a predetermined horizontally spaced relationship.

2. A bumper beam for a vehicle comprising a pair of opposed inner and outer C-shaped channel members respectively forming inner and outer sides of the bumper beam, the inner and outer channel members having upper and lower flanges extending respectively outwardly and inwardly from substantially vertically oriented center web portions, the channel members being interconnected to form a unitary, hollow beam, the inner side of the beam being adapted to be mounted so as to be facing a vehicle frame, the channel members having differing arcuate sweeps in a horizontal plane, such that the longitudinal spacing between the web portions of the channel members differs over the length of the beam, the outer channel member having a greater arcuate sweep than the inner channel member, such that the spacing between the channel members is greater at the center of the bumper beam than the ends of the bumper beam.

3. A bumper beam as in claim 2 wherein the inner channel member is substantially straight.

4. A bumper beam as in claim 2 wherein the channel members are interconnected by a support member comprising at least one plate that extends between the channel members and is welded thereto to hold the channel members in a desired spaced relation.

5. A bumper beam as in claim 4 wherein the support member comprises a plurality of vertical bulkhead plates spaced along the beam that fit inside and extend between interior surfaces of the C-shaped channel members.

6. A bumper beam as in claim 5 wherein the bulkheads plates are convoluted so as to provide energy absorbing beam crush characteristics during a high speed collision.

7. A bumper beam as in claim 6 wherein a separate serpentine plate is positioned at a centered position in the bumper beam between the channels.

8. A bumper beam as in claim 2 wherein one or more support members interconnect the channel sections, the support members comprising one or more tie plates that extend between and overlap the flanges on the channel members and are non-releasibly fastened thereto.

9. A bumper beam as in claim 8 wherein a tie plate is fastened to at least one of the flanges of the outer channel member and extends inwardly therefrom, the tie plate having a outer edge with a longitudinal curvature that is compatible with the curvature of the outer channel member, the tie plate having an inner edge with a longitudinal curvature that is compatible with the curvature, if any, of the inner channel member.

10. A bumper beam as in claim 9 wherein the tie plate has a vertically extending flange on the inner edge thereof that mates with the vertical center web of the inner channel member.

11. A bumper beam as in claim 2 wherein the center web of at least one channel member is perforated with one or more holes so as to reduce the amount of material in the beam.

12. A bumper beam as in claim 9 wherein the outer channel member is longer than the inner channel member, the inner channel member being positioned between ends of the outer channel member, the support member including tie plates on upper and lower sides of the channel members that extend beyond ends of the inner channel member so as to provide reinforcement for the outer channel member beyond the ends of the inner channel member.

13. A bumper for a vehicle comprising;
    a bumper beam formed of opposed C-shaped channel members, wherein an open side of each channel member faces the other channel member, the channels comprising vertically oriented center webs having outwardly extending flanges on upper and lower edges thereof, the channel members being interconnected by at least one support member connected to and extending between the channel members, the channel members including a first channel member adapted to be positioned away from the vehicle and a second channel members being adapted to be positioned adjacent the vehicle, the beam being attachable to the vehicle, the first channel member having a significant horizontal curvature, the second channel member having a lesser horizontal curvature, if any, such that the distance between front and rear sides of the channel members differs over the length of the beam, with the distance being greater at the center of the beam than at the sides of the beam;
    an energy absorber positioned adjacent an outer side of the web of the first channel member; and
    a facia formed of a resilient resin positioned over the outer side of the first channel member, the energy absorber fitting in an open space between the facia and the outer side of the first channel member.

14. A bumper beam for a vehicle comprising inner and outer opposed C-shaped sections connected together to form a unitary beam member, the outer section having a greater curvature in a horizontal plane than the inner section, such that the distance between front and rear sides of the beam differs over the length of the beam and is greater at the center of the beam than at the ends of the beam.

15. A bumper beam according to claim 14 wherein the C-shaped sections comprise vertically oriented web portions having upper and lower flanges extending therefrom, the respective upper and lower flanges of the inner and outer sections being fastened together to form the unitary beam.

16. A bumper beam according to claim 15 wherein the beam has a generally rectangular cross section, with the horizontal depth of the beam being greater at the middle than at the ends of the beam.

* * * * *